United States Patent [19]

Sauer et al.

[11] Patent Number: 5,329,841
[45] Date of Patent: Jul. 19, 1994

[54] PISTON-SLIDE-VALVE

[75] Inventors: Axel Sauer, Nürtingen; Roland Meyer, Roth, both of Fed. Rep. of Germany

[73] Assignee: Hydraulik-Ring GmbH, Nürtingen, Fed. Rep. of Germany

[21] Appl. No.: 849,732

[22] Filed: Mar. 12, 1992

[30] Foreign Application Priority Data

Mar. 14, 1991 [DE] Fed. Rep. of Germany ....... 4108272

[51] Int. Cl.[5] .......................... F16J 1/00; B23H 1/00
[52] U.S. Cl. .................................. 92/172; 91/462;
29/890.12; 137/116.3; 137/675.69; 219/69.12;
219/69.17
[58] Field of Search ............... 92/172; 91/462, 465;
29/890.12, 890.125, 890.126, 890.127, 890.128,
890.132; 137/116.3, 625.69, 625.3, 625.25;
251/324; 219/69.12, 69.17, 121.12, 121.2

[56] References Cited

U.S. PATENT DOCUMENTS

| | | | |
|---|---|---|---|
| 2,295,111 | 9/1942 | Hemmings | 29/890.125 |
| 3,052,013 | 9/1962 | Kane | 219/69.17 |
| 3,562,702 | 2/1971 | Celovsky | 219/69.17 |
| 3,975,609 | 8/1976 | Martin et al. | 29/890.132 X |
| 4,345,138 | 8/1982 | Zammert | 219/121.17 X |
| 4,862,920 | 9/1989 | Cleasby | 137/625.69 X |
| 4,941,508 | 7/1990 | Hennessy et al. | 251/324 X |
| 4,983,803 | 1/1991 | Pringle et al. | 219/69.12 X |

FOREIGN PATENT DOCUMENTS

| | | | |
|---|---|---|---|
| 1074346 | 1/1960 | Fed. Rep. of Germany | 137/625.25 |
| 1229391 | 11/1966 | Fed. Rep. of Germany | 137/625.69 |
| 8000870 | 5/1980 | PCT Int'l Appl. | 137/625.69 |

*Primary Examiner*—Edward K. Look
*Assistant Examiner*—Hoang Nguyen
*Attorney, Agent, or Firm*—Albert H. Reuther

[57] ABSTRACT

A piston-slide valve including a housing in which a piston with at least one oil groove and control edge is guided shiftable or slidable in a bore characterized thereby that the oil groove of the piston is manufactured via wire erosion. Also the control edges of the piston are manufactured by wire erosion. The bore of the sleeve bushing is manufactured by wire erosion. The piston is made out of a needle roller. The piston has a length of approximately 13 mm and a diameter of approximately 2 mm. The wire for eroding of the piston as well as the sleeve bushing has a diameter of approximately 2/10 mm. Longitudinal sides of a multiple edged groove base or bottom of the oil groove of the piston and control edges therewith are formed in a first working step procedure and the remaining longitudinal edges of the oil groove and the remaining control edges are formed in a further working step. The piston occupies one position and another working position displaced by 900° from each other. Several needle rollers arranged in a multiple compartment holding device are produced via wire erosion in common with each other. During the machining or working of the bore of the bushing sleeve, the bushing sleeve is erodible with a wire with at least one further identical bushing sleeve in common therewith in one working step.

12 Claims, 3 Drawing Sheets

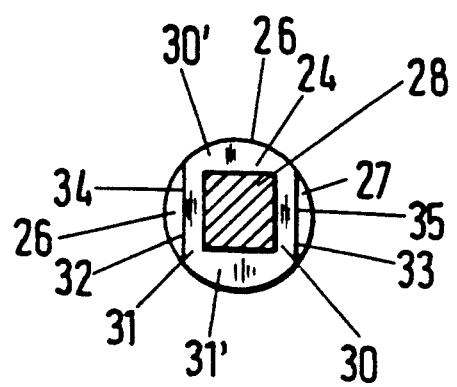
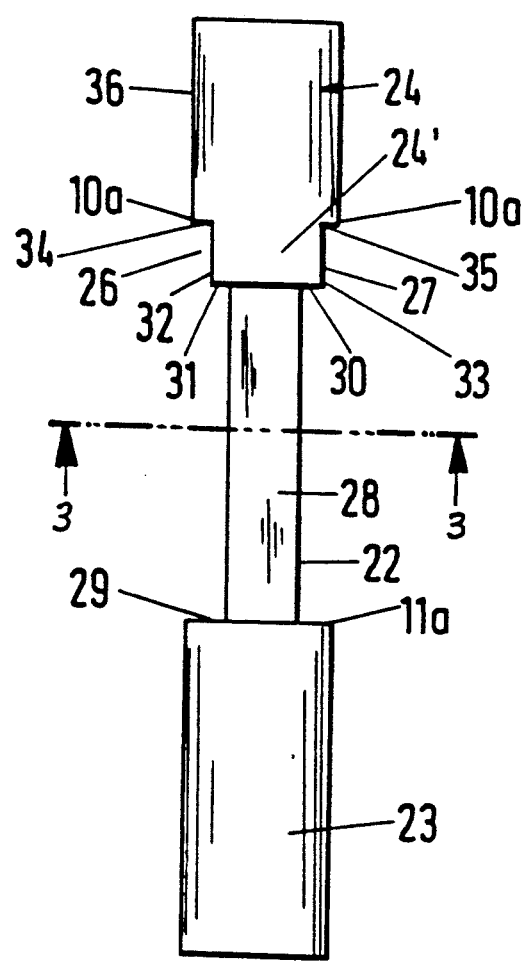

PISTON-SLIDE-VALVE

BACKGROUND OF THE INVENTION

1. Field of the Invention

The present invention concerns a piston-slide-valve including a housing, in which a piston with at least one oil groove and control edges is guided slidable in a bore.

2. Description of the Prior Art

With known piston-slide-valves of this type, the pistons are produced by turning, whereby the control edges are milled or cut thereon, hardened, ground and eventually perhaps being worked or machined by finishing and lapping. The bore for receiving the piston is produced by boring, grinding and honing. Disadvantageous hereby is that especially with small pistons, which for example have a diameter of 2 millimeters, there can be attained only a relatively small or nominal accuracy of the piston-running or travel play. Such pistons with high system pressures have inadequate or insufficient leakage values. Via relatively large production, manufacturing or finishing tolerances during the manufacture of the pistons and the receiving bore for the piston means, in an extreme situation large running play or travel can arise and occur in the installed or built-in condition or situation. Thereby high leakages can occur or arise, which with control of small oil flows are very disturbing.

SUMMARY OF THE INVENTION

An object of the present invention basically is to embody and construct a valve of the generic type in such a manner that also small construction types, which work or operate at high pressures, only have a very small or nominal leakage and can be produced in a cost-advantageous and economical manner.

This object is fulfilled with a valve having features in accordance with the present invention in that the oil groove of the piston is produced or manufactured by wire erosion.

As a consequence of the present inventive configuration and embodiment, the valve can be produced in an extremely cost-advantageous and economical manner, since the piston means can be produced in series or mass production. Via the wire erosion there are eliminated the mechanical working or machining stages, such as hardening, grinding, lapping, as well as the machining steps or stages of turning for production of circulating or surrounding oil grooves and cutting or milling for production of fine-control edges. Consequently thereby substantially all forms of oil grooves and fine-control edges can be produced or manufactured in the closest and most narrow tolerances. If especially for production or manufacture of the piston means there is employed a bearing pin or bed needle, which can be delivered and supplied in $\mu m$ tolerances, then considerable costs can be saved, since the bearing pins are inexpensive or penny articles. The pistons can be produced in large series or mass production, since only small or nominal material removals are provided via wire-erosion. Correspondingly the bore for receiving the piston can be made or produced simply and in a cost-advantageous and economical manner. With the production and manufacture of the bore there can be attained a very high cylindrical characteristic or simplicity. Widening or expansion at the control edges, which can involve and carry a high leakage accompanying the same, are satisfactorily avoided and eliminated. Advantageously accordingly the pistons can be manufactured or produced and made with the smallest or most nominal tolerances with very small measurements or dimensions, for example with a piston diameter of 2 mm and a length of 13 min. The pistons consequently have only very small or nominal leakage losses and consequently also can be installed to operate also at high pressures, for example up to 190 bar. Hereby the leakage is reduced to a minimum with a very low viscosity of maximum 5 qcm/min. Also disturbing edges, ridges or burrs, which can occur or arise via a mechanical machining, are removed by the erosion or eroding, and are not pressed away, as for example during honing. Consequently the high leakages, which are very disturbing during the control of small oil flows, are hindered or prevented with certainty and the valve can be produced simply and in a straight forward manner with a very small or nominal cost involved therewith.

BRIEF DESCRIPTION OF THE DRAWINGS

These as well as other objects and advantages of the present invention will appear more clearly from the following specification in conjunction with the accompanying drawings. Many of the attendant advantages of this invention will be readily appreciated as the same becomes better understood by reference to the following detailed description when considered in connection with the accompanying drawings, which show and include:

FIG. 2 is a view that shows an enlarged representation or illustration of a piston-slide-valve according to FIG. 1 in an elevational view;

FIG. 3 is a view that shows a cross section taken along line A—A in FIG. 2;

DETAILED DESCRIPTION

Figure 1:
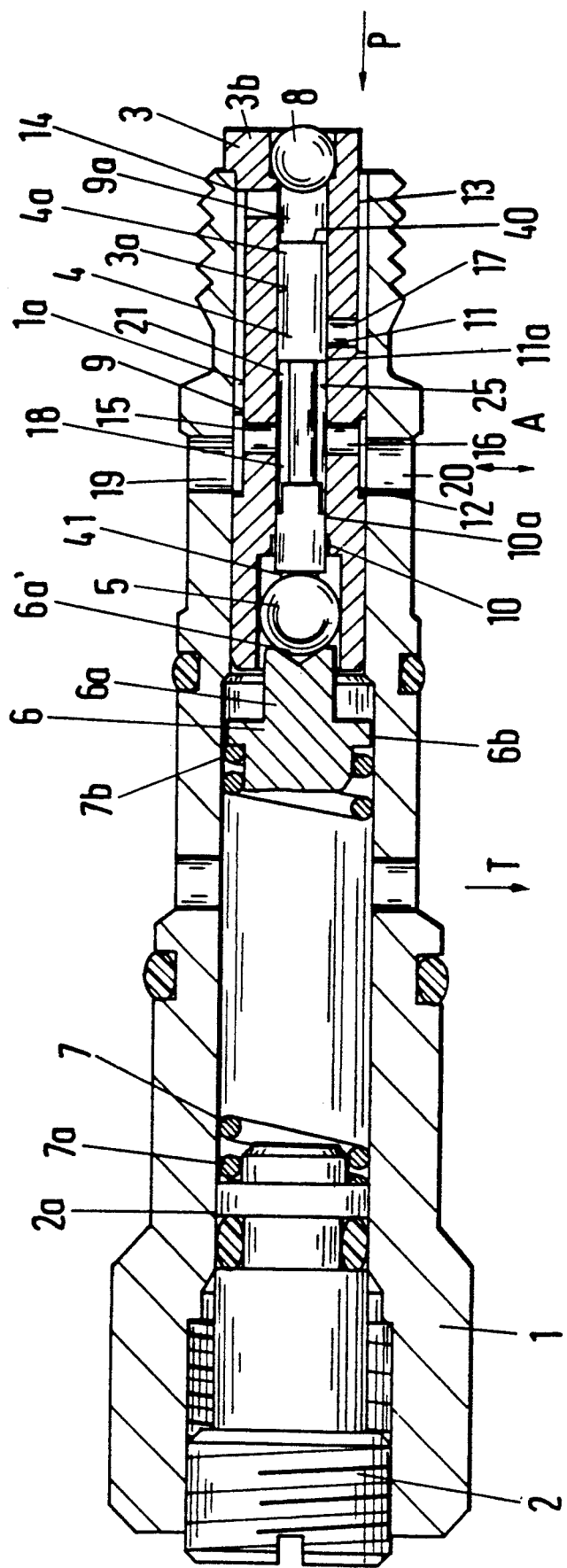
FIG. 1 is a view that shows an axial section longitudinally of the piston-slide-valve having features in accordance with the present invention.
Figure 4:
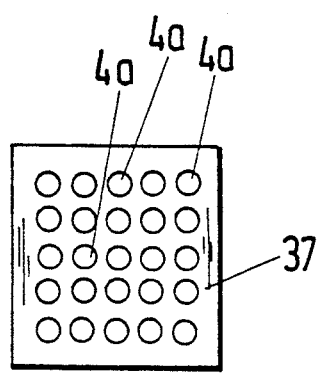
FIG. 4 is a plan view that shows a multiple holding or support for needle rollers as raw or unfinished members compartmented for the manufacture or production of the piston according to FIG. 1.
Figure 5:
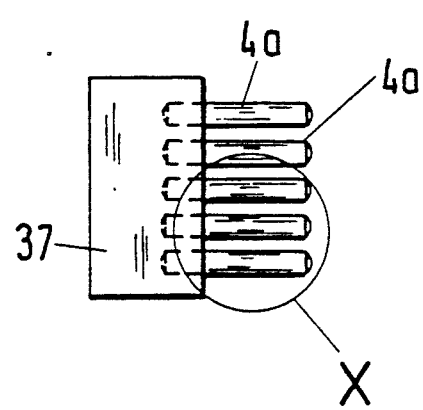
FIG. 5 is a view that shows a multiple holding or compartmentalized support for needle rollers or pins according to FIG. 4 in a side view thereof.

The piston-slide-valve according to FIG. 1 comprises a housing 1, in which an adjustment screw 2, a bushing or sleeve 3, a piston 4, a sphere or ball 5, a spring plate, disk or land 6, a spring 7 and a closure ball or sphere 8 are arranged. The piston is slidably or shiftably arranged in a bore 3a of the sleeve or bushing 3. The spring plate, disk or land 6 has a tapered extension 6a with an end-face depression or recess 6a', in which a sphere or ball 5 is supported. The spring 7 lies or engages with one end 7a a against a ring or annular collar 2a of the adjustment screw 2 and with the other end 7b thereof engaging or lying against a flange 6b of the spring plate, disk or land 6. The piston end 4a remote or away from the adjustment screw 2 lies in a location with spacing from the closure ball or sphere 8, so that a space or chamber 9a for the pressure medium, preferably oil, is formed between the ball and the piston end. The adjustment screw 2 is threaded or screwed into one end of the housing 1, over the other end of which the sleeve or bushing 3 projects. A bore 3a thereof is closed by the closure ball 8 at the projecting or extending bushing or sleeve end.

The housing 1 has a working connection A, 19, 20 and has a tank connection T in the region of the spring 7. The pressure chamber 9a between the piston 4 and the closure ball 8 is connected via a pressure return line or conduit 9 with the working connection A, 19, 20. For this the sleeve or bushing 3 is provided with a transverse bore or hole 14, which connects the pressure chamber 9a with the pressure return line or conduit 9. The sleeve or bearing 3 additionally has further transverse bores or holes 15, 16 and a control bore 17. The transverse bores or holes 15, 16 connect the pressure return line or conduit 9 with a pressure chamber 18 between the piston ends, while the control bore 17 connects or opens into a pressure connection 13 of the piston-slide-valve.

The pressure medium can flow in the pressure chamber 18 via the control bore 17 upon corresponding positioning of the piston 4.

As shown by the FIGS. 2 through 7, the piston 4 is produced out of a needle roller. For formation of the pressure chamber 18 in the valve there is produced via wire erosion or eroding a preferably rotating or circulating groove on the piston 4. The piston 4 has very small measurements or dimensions; the piston 4 is preferably only 13 mm long and has a diameter of 2 mm. The piston diameter however also can lie in a range of, for example, only 1 mm.

The pressure chamber 18 is limited or bounded outwardly by the bore wall 25 of the bore 3a of the sleeve or bushing 3 and inwardly is limited by the peripheral or circumferential groove 22 and two grooves 26, 27 of the piston 4, which extend between two end segments or sections 23 and 24 (FIGS. 2, 3) of the piston 4. The one end segment or section 23 lying in the installed or built-in condition of the piston adjoining or neighboring the closure ball 8 is longer than the other end section or segment 24 and approximately or substantially equally as long as the peripheral or circumferential groove 22. It is formed by four sides of the piston produced by wire erosion or eroding lying and located at right angles to each other, as will be explained still further herein. The middle or median tapered piston section or segment 28 remaining in the range of the peripheral or circumferential groove 22 has a square, preferably quadratic cross section as shown in FIG. 3. Between the tapered section or segment 28 and the piston end section or segment 23 there is formed a ring or annular shoulder 29 having an edge that forms the control edge 11a. The tapered section or segment 28 proceeds at the other end over a further ring or annular shoulder 30, 31, 30', 31' extending parallel to the shoulder 29 having a transition into a partial segment or section 24' providing diametrical grooves 26, 27 lying or located opposite each other. The grooves 26, 27 extend in longitudinal direction of the piston 4 and are relatively short in comparison to the groove 22; the length thereof is approximately or substantially equal to a quarter or one fourth of the length of the end section or segment 24 of the piston 4.

The smooth, level or even bottom 32, 33 of the grooves 26, 27 has a transition respectively at a time via and over a radial shoulder surface 34, 35 into the peripheral or circumferential surface 36 of the section or segment 24 (FIG. 3). The grooves 26, 27 are constructed and embodied identically and are only approximately half as deep as the peripheral or circumferential groove 22. The shoulder surfaces 34 and 35 form the control edge 10a with the assembled piston 4 (FIG. 1).

As shown in FIG. 3, the grooves 26, 27 respectively at a time have segment-shaped cross section. The groove bottom or base 32, 33 extends parallel to the respectively adjoining side wall of the piston segment or section 28. The grooves 26, 27 are open axially in a direction toward the end section or segment 23 and are closed in opposite direction by the shoulder surfaces 34, 35.

The control piston 4 can be manufactured or produced in a simple, straight forward and cost advantageous manner as inexpensive or penny articles. The control piston 4 can be produced and manufactured advantageously with further identical pistons in one working or machining stage or step in series and mass production. For this purpose bar or rod-shaped needle rollers respectively bearing needles 4a (FIGS. 4 through 7) are arranged in a multiple-support or compartmented holding device or apparatus 37. The device 37 is constructed in a box-manner and has insert openings provided for receiving of the needle rollers 4a; the needle rollers 4a are inserted or placed in the insert openings. Thereafter the needle rollers arranged in the holding device 37 are worked or machined with a non-illustrated erosion or eroding wire, which preferably has a wire diameter of approximately or substantially 2/10 mm. Hereby the grooves 22, 26 and 27 as well as the control edges 10a, 11a of the piston are formed. The erosion or eroding wire is moved longitudinally of the needle rollers 4a for machining or working longitudinally thereof upon a course or path represented by arrows 38 and 39 in the FIGS. 6 and 7.

Figure 6:
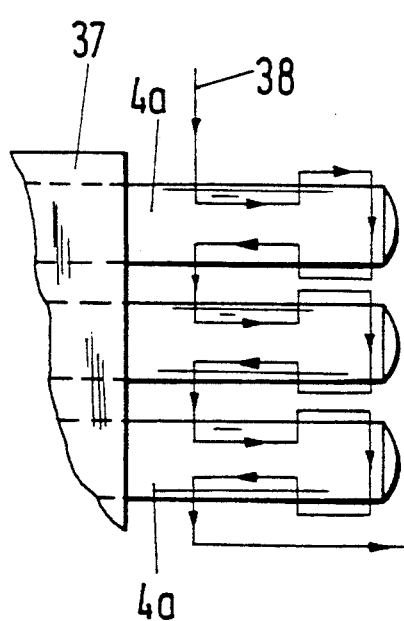
FIG. 6 is a view that shows in detail features within a circle-like configuration X in FIG. 5 in an enlarged illustration with drawn-in or marked travel path of an eroding or erosion wire for production of grooves and control edges of the piston according to FIG. 2.

First, as shown by FIG. 6, the peripheral or circumferential groove 22 with the control edge 11a is formed via movement or travel of the wire longitudinally of the path or course 38, whereby all needle rollers 4a arranged in the holding device 37 are machined or worked sequentially in the same manner. Then the holding device 37 with the so machined or worked needle rollers 4a is turned or rotated by 90° into the position illustrated in FIG. 7. Now the erosion or eroding wire is moved to travel longitudinally of the pre-worked or pre-machined needle rollers 4a. The erosion or eroding wire is advanced or moved further longitudinally or along the path or course 39 for formation of the grooves 26, 27 and the control edge 10a.

Next the erosion or eroding wire is moved axially in the needle roller 4a and thereby a part 30 respectively 31 of the shoulder surface 30, 31, 30', 31' is formed. As soon as the required radial depth is reached or attained, the erosion or eroding wire is moved to travel axially and thereby there is produced or manufactured an even or smooth side wall of the piston section or segment 28 (FIG. 3) respectively the one smooth or even and level bottom or base of the peripheral circumferential groove 22. As soon as the required or necessary axial length of the circumferential or peripheral groove 22 is reached or attained, the erosion or eroding wire is again moved outwardly, whereby a part of the shoulder surface 29 is produced or manufactured. Externally of the needle roller 4a there is noted that the erosion or eroding wire is moved as far as to the adjoining end of the needle roller. So far as this end at its face must still be machined or worked in a clean manner, this end is separated vertically or at right angles to the piston axis with the erosion or eroding wire as illustrated in FIG. 6. Subsequently the erosion or eroding wire is moved back axially again externally of the needle roller 4a until the erosion or eroding wire is located in the height or level of the oppositely located already produced part of the shoulder surface 29. The erosion or eroding wire is then moved radially again in the needle roller 4a and thereby a further part of the shoulder surface 29 is manufactured or produced by erosion or eroding. If the necessary or required radial depth is reached or attained, the eroding or erosion wire is again moved axially and thereby a further even, smooth or level base or bottom of the peripheral groove 22 is produced. As soon as the required or necessary axial length of the peripheral groove 22 is reached or attained, the eroding or erosion wire is again moved radially outwardly and thereby a further part 31, respectively 30 of the shoulder surface 30, 31, 30', 31' is produced by erosion or eroding.

The erosion or eroding wire is now moved radially in the adjoining or neighboring needle roller 4a, which is worked or machined in the same or identical manner as previously described via wire erosion or eroding. In this manner sequentially all needle rollers located in the holding device or apparatus 37 are machined or worked.

Figure 7:
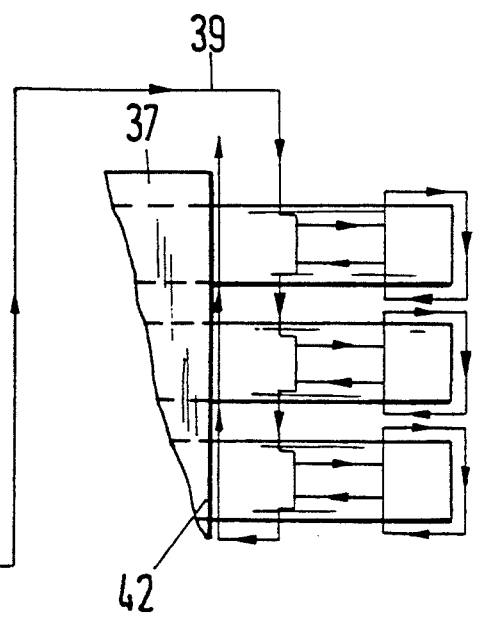
FIG. 7 is a view that shows in detail within the range of a circle-like configuration X in FIG. 5 in a position rotated by 90° relative to the position according to FIG. 6.

As soon as all needle rollers 4a are machined or worked, the holding device or apparatus 37 is turned or rotated by 90° (FIG. 7). The erosion or eroding wire is moved for formation of the shoulder surface 34 respectively 35 radially into the partially machined or worked needle roller 4a. As soon as the desired radial depth is reached or attained, the eroding wire is moved axially in a direction toward the end segment or section 23. Thereby the one segment-shaped groove 26 respectively 27 is produced. When the eroding or erosion wire reaches or attains the height or level of the previously already produced shoulder surface 30, 31, 30', 31' the erosion or eroding wire is moved radially still further inwardly and thereby a further part 30' respectively 31' of the shoulder surface 30, 31, 30', 31' is produced. After reaching or attaining the necessary or required depth, the eroding or erosion wire is moved axially in a direction toward the end section or segment 23 and thereby a further even, smooth or level bottom or base of the peripheral groove 22 is produced by erosion or eroding. As soon as this base or bottom has the required or necessary axial length, the erosion or eroding wire is moved radially outwardly and hereby a further part of the shoulder surface 29 of the end section or segment 23 is produced.

The erosion or eroding wire is guided or moved around externally of the end section 23 thereabout and upon the oppositely located side for formation of the remaining part of the shoulder surface 29 is moved radially again in the needle roller 4a. When the erosion or eroding wire has attained or reached the necessary or required radial depth, the erosion wire is moved from the end section or segment 23 proceeding axially in a direction toward the oppositely located end of the needle roller 4a. Thereby again an even or level bottom or base of the peripheral groove 22 is produced. As soon as this bottom or base has the necessary or required axial length, the erosion or eroding wire is moved radially outwardly for formation of the remaining part 30' respectively 31' of the shoulder surface 30, 31, 30' 31'. Subsequently the erosion or eroding wire is moved axially again and thereby the other segment-shaped groove 27 respectively 26 is produced. As soon as the required or necessary axial length is reached or attained, the erosion or eroding wire is moved out radially from the needle roller 4a under formation of the shoulder surface 35 respectively 34.

In the described manner, as represented and indicated by the line 39 in FIG. 7, sequentially the needle rollers 4a are machined or worked by wire erosion or eroding.

In conclusion the needle rollers 4a are separated with spacing from the upper or top side 42 of the holding device or apparatus 37 via the erosion or eroding wire at right angles to the axis of the needle rollers.

The erosion or eroding wire during the erosion or eroding procedure is unwound or removed continuously from a supply drum or the like, so that always a clean wire section or segment is available for the erosion or eroding.

Both with the first machining or operation according to FIG. 6 as well as also during the machining or operation after turning or rotating of the holding device or apparatus by 90° into the position according to FIG. 7, the needle rollers 4a are machined sequentially or one after the other, whereby the erosion or eroding wire is moved along uninterrupted paths or courses 38 and 39. In this manner the pistons respectively the grooves and control edges thereof can be produced extremely accurately, so that valves equipped with these pistons as a consequence of the high machining accuracy of the pistons have or provide only very small or nominal leakage losses. Thereby the pistons can be produced or manufactured in series or mass production in an extremely cost-advantageous and inexpensive manner. The multiple or compartmentalized holding device or apparatus 37 employed for machining respectively holding of the needle rollers 4a is relatively simply embodied and constructed. With this apparatus 37 the piece costs can be kept small or nominal via the simultaneous machining or working of the needle rollers. All forms of oil grooves and fine control edges also can be produced simply and in a straight forward manner in the closest and most narrow tolerances.

The receiving bore 3a of the sleeve or bushing 3 for the piston 4 is likewise produced or manufactured by wire erosion or eroding. Advantageously hereby is that besides the very small production, manufacturing or finished tolerances also the exact cylinder shape of the bore can be attained. On the other hand disturbing burrs, which can arise, result or be encountered by a mechanical machining, are removed during the wire erosion or eroding and not being pressed away as with a mechanical machining, for example via honing. With the erosion or eroding of the receiving bore 3a there is first pre-bored the bore. With the described piston diameter of 2 mm there is pre-bored for example to an open width of 1.7 mm. Subsequently the erosion or eroding wire is moved automatically into the pre-worked or machined bore and there is arranged centrally or in the middle thereof. Because of the small or nominal length of the piston and with that also of the sleeve or bearing there can be machined or worked in common at least two identical sleeves or bearings in one working or machining step or stage. For this purpose the sleeves or bushings are arranged sequentially in a non-illustrated holding device or apparatus. The eroding or erosion wire employed for eroding or erosion has a very small diameter of approximately 2/10 mm as with the machining or working of the needle rollers. The erosion or eroding wire is automatically threaded or located centrally in the bore and then proceeds to travel programmed along a circular path or course. Hereby there are first approached four points. The so ascertained or determined values are then averaged, whereupon the wire from the middle traverses a circular path or course exactly defined with steps of for example 0.25 μm. Via wire erosion or eroding there is attained and reached an absolutely cylindrical form of the bore, so that this is absolutely straight, accordingly having no widening or expansion at control edges or at the beginning of the bore. With the described wire erosion or eroding the respective or particular wire section or segment respectively is employed over the entire length of the bore to be machined or worked, so that a very high cylindrical characteristic of the bore is attained.

On the basis of FIG. 2 there is described a groove 22 of the piston 4 circulating or rotating with the bottom or base thereof being formed via four smooth, even or straight side surfaces of the piston segment 28 such that for example also a triangular cross section can be provided therewith. It is however also possible to construct or embody the groove only having two edges in cross section; the groove is then no longer embodied or constructed circulating or rotating. Then in the bore wall there must be provided a corresponding groove.

The three-way pressure reducing valve represented in FIG. 1 regulates in the working or operating connection A, 19, 20 a pressure adjusted via the spring 7 independently of delivery or feed pressure. If the force effective via the pressure in chamber 9a upon the free end surface 40 of the piston end segment 23 is in balance with the force of the spring 7, which is effective via the spring plate or disk 6 and the ball 5 upon the other end surface 41 of the piston end segment 24, then the control edges 11, 11a and 10, 10a are in the so-called closed position (FIG. 1) coinciding with the illustration in FIG. 1. In this situation no oil then flows from the pressure connection 13 to the working connection A, 19, 20 or from the working connection to the tank connection T. Only as a consequence of leakage, which results via the piston running or travel play, can oil flow outwardly. Via the described embodiment and construction of the piston 4 and the sleeve or bushing 3 is the leakage, which represents a lost efficiency or capacity, is reduced to a minimum. If the pressure drops or decreases at the connection A, 19, 20, which is effective upon the piston end face 40 via the groove 9 in the space or chamber 9a, the force of the spring 7 prevails or is predominant, whereby via the control edges 11, 11a the connection is opened from the pressure connection 13 to the working connection A, 19, 20. The connection remains open so long until the pressure in the working connection A, 19, 20 has risen or increased so far that the pressure force can overcome the spring force and the connection from the pressure connection 13 to the working connection A, 19, 20 is closed again. If then the pressure rises at the connection A, 19, 20 over the adjusted or set value, the piston 4 moves against the force of the spring 7 and opens the connection from the working connection to the tank connection T via the control edges 10 and 10a so long until the spring force prevails or is predominant and thereby the piston 4 is shifted or pushed into the closure position according to FIG. 1.

In conclusion, the present invention concerns a piston-slide valve having a housing in which a piston with at least one oil groove and control edge means is shiftably or slidably guided in a bore characterized thereby that the oil groove 22, 26, 27 of the piston 4 is manufactured via wire erosion or eroding.

The control edges 10, 10a; 11, 11a of the piston 4 are produced or manufactured by wire erosion or eroding.

The value with which the piston is arranged in a bore of a sleeve or bushing is further characterized thereby that the bore 3a of the sleeve or bushing 3 is manufactured or produced via wire erosion or eroding.

The piston 4 is manufactured or produced out of a needle roller 4a.

The circular shape of the bore 3a of the sleeve or bushing 3 is manufactured or produced in a curved-control or regulated manner.

The one oil groove 22 of the piston 4 is constructed circulating or rotating and at the groove base or bottom has at least a multi-edge profile or shape, preferably a four-edge or square profile or shape.

The oil groove 22, 26, 27 of the piston 4 at the groove base or bottom is constructed and embodied having two edges.

The piston 4 has a length of approximately 13 mm and a diameter of approximately 2 mm.

The wire for eroding of the piston 4 and/or the bushing or sleeve 3 has a diameter of approximately 2/10 mm.

The longitudinal sides of the multi-edge groove base or bottom of the oil groove 22 of the piston 4 and the control edges 11a are formed in a first machining or working stage or procedure and the other longitudinal edges of the oil groove 22 and the other control edge means 10a are formed in a further machining working step or procedure.

The piston 4 in one machining position and in the other machining position occupies a location displaced by 90° as to these positions with respect to each other.

Several needle rollers 4a arranged in a multiple compartment holding device or apparatus 37 are produced in common via wire erosion or eroding.

During the machining or working of the bore 3a of the sleeve or bushing 3, the bushing or sleeve is erodible with a wire in one working step or stage with at least one further identical sleeve or bushing.

The present invention is, of course, in no way restricted to the specific disclosure of the specification and drawings, but also encompasses any modifications within the scope of the appended claims.

What we claim is:

1. A piston-slide valve including a housing having a bore therein as well as including a piston with at least one oil groove having a groove bottom and control edge means therewith, the piston slides as guided in the bore of the housing, comprising:

a needle roller out of which said piston is made by application of wire erosion to produce the oil groove of the piston displaced in working positions;

said needle roller having said at least one oil groove and said control edge means therein as formed by the wire erosion;

a multiple-edge profile located in the groove bottom of said at least one oil groove; and a sleeve bushing inserted in said housing and including an inner wall thereof that forms the bore made by wire erosion in which a piston in one position and in another working position occupies location displaced by 90° with respect to the working positions.

2. A piston-slide valve including a housing having a bore therein as well as including a piston with at least one oil groove having a groove bottom and control edge means therewith, the piston slides as guided in the bore of the housing, comprising:

a needle roller out of which said piston is made by application of wire erosion to produce the oil groove of the piston;

said needle roller having said at least one oil groove and said control edge means therein as formed by the wire erosion; and a multiple-edge profile located in the groove bottom of said at least one oil groove;

on the one hand longitudinal sides of the multi-edge groove base of the oil groove of the piston and corresponding control edges being formed in a first working step procedure and the remaining longitudinal edges of the oil groove and the remaining control edges being formed in a further working step procedure;

the piston in one position and in another working position occupies location displaced by 90° with respect to the working positions.

3. A valve according to claim 2, further comprising control edges of the piston produced by wire erosion.

4. A valve, with which said piston is arranged in a bore of a sleeve bushing according to claim 2, including a means forming a bore in the sleeve bushing produced by wire erosion.

5. A valve according to claim 2, in which said piston is produced out of a needle roller.

6. A valve according to claim 5, in which the bore of said sleeve bushing has a circular shape produced with curve control regulation via wire erosion.

7. A valve according to claim 2, in which said multi-edge profile is a four-edge square profile shape.

8. A valve according to claim 2, in which the oil groove of the piston at the groove base is constructed having two edges.

9. A valve according to claim 2, in which said piston has a length of substantially 13 mm and a diameter of substantially 2 mm.

10. A valve according to claim 9, in which the wire for eroding of the piston as well as the sleeve bushing has a diameter of substantially 2/10 mm.

11. A valve according to claim 5, in which multiple needle rollers are arranged in a multiple compartment holding support device manufactured in common by wire erosion.

12. A valve according to claim 6, in which during the machining of the bore of the sleeve bushing the bushing is erodible with the wire in one working step procedure in common with at least one further identical sleeve bushing.

* * * * *